(12) United States Patent
Unser et al.

(10) Patent No.: US 9,792,610 B2
(45) Date of Patent: Oct. 17, 2017

(54) NON-PAYMENT COMMUNICATIONS USING PAYMENT TRANSACTION NETWORK

(71) Applicant: MasterCard International Incorporated, Purchase, NY (US)

(72) Inventors: Kenny Unser, Fairfield, CT (US); Kent Olof Niklas Berntsson, Rye, NY (US); Jean-Pierre Gerard, Croton-On-Hudson, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 117 days.

(21) Appl. No.: 14/325,823

(22) Filed: Jul. 8, 2014

(65) Prior Publication Data

US 2016/0012443 A1    Jan. 14, 2016

(51) Int. Cl.
G06K 5/00 (2006.01)
G06Q 20/40 (2012.01)
G07G 1/14 (2006.01)
G06Q 20/20 (2012.01)

(52) U.S. Cl.
CPC ......... *G06Q 20/409* (2013.01); *G06Q 20/202* (2013.01); *G07G 1/14* (2013.01)

(58) Field of Classification Search
CPC ....... G06Q 20/20; G06Q 20/204; G06Q 30/06
USPC ......................................... 235/380, 383, 385
See application file for complete search history.

(56) References Cited

U.S. PATENT DOCUMENTS

| | | | |
|---|---|---|---|
| 6,397,194 B1* | 5/2002 | Houvener et al. ............. 705/16 |
| 7,712,661 B2 | 5/2010 | Thomas | |
| 7,908,170 B2 | 3/2011 | Asmar et al. | |
| 8,560,446 B2 | 10/2013 | Nguyen et al. | |
| 8,645,270 B2 | 2/2014 | Mallean et al. | |
| 2005/0114215 A1* | 5/2005 | Tramontano et al. ......... 705/16 |
| 2006/0184441 A1* | 8/2006 | Haschka et al. ............... 705/35 |
| 2008/0103912 A1 | 5/2008 | Naccache | |
| 2011/0035301 A1 | 2/2011 | Small | |
| 2011/0131135 A1* | 6/2011 | Carlson .................. G06Q 10/00 705/44 |
| 2012/0084135 A1 | 4/2012 | Nissan et al. | |
| 2015/0220934 A1* | 8/2015 | Chauhan .............. G06Q 20/204 705/17 |

* cited by examiner

*Primary Examiner* — Daniel St Cyr
(74) *Attorney, Agent, or Firm* — Buckley, Maschoff & Talwalkar LLC

(57) ABSTRACT

A communication channel is provided between a transaction acquirer and a payment network, for the purpose of transmitting payment card account transaction authorization requests. Via the communication channel the payment network may receive a message containing additional information. The additional information may originate at the point of sale and may be in addition to a PAN (primary account number) or the like. The payment network may send a message including the additional information to an entity that is neither a payment account issuer nor the transaction acquirer.

18 Claims, 7 Drawing Sheets

NON-PAYMENT COMMUNICATIONS USING PAYMENT TRANSACTION NETWORK

BACKGROUND

When a customer purchases an item at a point of sale (POS) terminal, transaction information is generated, as is well known. A primary conventional use of at least some of the transaction information is to populate an authorization request to be routed via a payment network to an issuer of a payment card account. Merchants engage in another well-known use of transaction information when they issue loyalty accounts to their customers and track the customers' purchases from the merchants via the loyalty accounts. In a proposal disclosed in U.S. published patent application no. 2012/0084135, filed by inventors Daniel Nissan et al., transaction information is transferred from the merchant's POS system to a central server computer for the purpose of implementing an electronic online transaction receipt system, intended to replace the printing of paper receipts.

The present inventors have recognized that the existing infrastructure of a payment system, such as the "Banknet" system operated by MasterCard International Incorporated (the assignee hereof), offers significant potential advantages in distributing and/or generating transaction information and/or other information from or at the point of sale, in addition to the conventional use of such systems in routing payment transaction authorization requests and authorization responses.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, transaction information that is generated at the point of sale may be transmitted to one or more parties that have a legitimate interest therein via a payment network, apart from the conventional routing of authorization requests and authorization responses to and from payment card account issuers via the payment network. In some embodiments, the payment network may provide a portion of a two-way communication channel between such a third party and the POS terminal One particularly useful application for this type of novel communication via a payment network may be for recording and tracking information relevant to product warranties.

Figure 1:
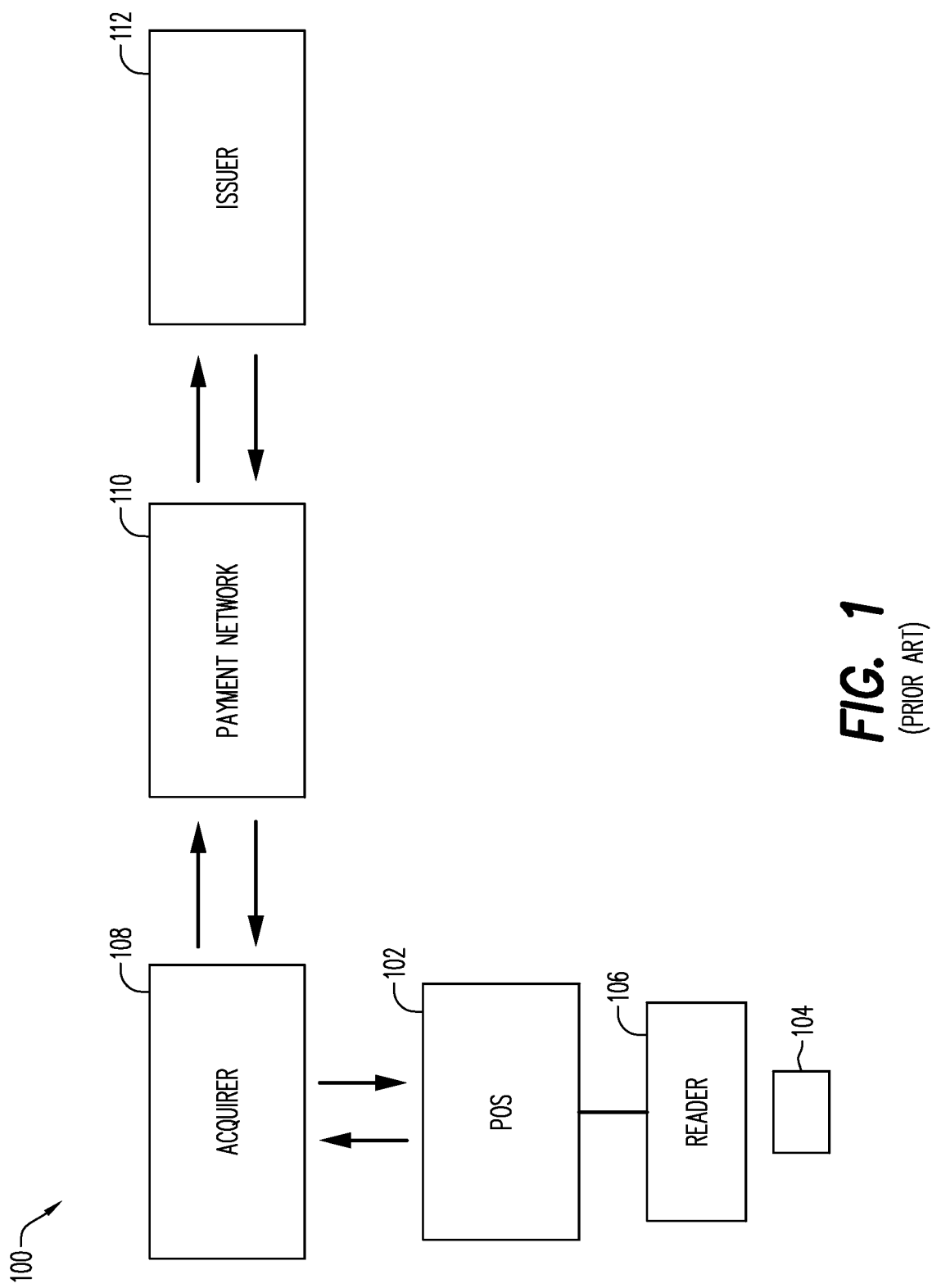
FIG. 1 is a block diagram that illustrates a conventional payment system.

FIG. 1 is a block diagram that illustrates a conventional payment system 100.

The payment system 100 includes a POS device 102 that is installed in a merchant's store at the point of sale/checkout counter (not separately shown). A payment card 104 is shown being presented to a reader component 106 associated with the POS device 102. (For at least some purposes, the reader component 106 may be considered part of the POS device 102.) The payment card 104 may be for example a magnetic stripe card. In addition or alternatively, the payment card 104 may include an integrated circuit (IC) chip (not separately shown) suitable for having data read from it by proximity RF (radio frequency) communications. The primary account number (PAN) for the payment card account represented by the payment card 104 is stored on the magnetic stripe (not separately shown) and/or the IC chip (if present) for reading by the reader component 106 of the POS device 102.

From the foregoing, it will be appreciated that the reader component 106 may also be conventional, and may be configured to perform either or both of magnetic stripe reading and reading of IC chips by proximity RF communications. Thus, the payment card 104 may be swiped through a mag stripe reading portion (not separately shown) of the reader component 106, or may be tapped on a suitable surface of the reader component 106 to allow for proximity reading of its IC chip.

Instead of a card-shaped payment device, such as the payment card 104, a suitable payment-enabled mobile phone, electronic wallet, or a payment fob may be presented to and read by the reader component 106. Thus, as used herein, the term "payment card" should be understood to include payment-enabled mobile phones, payment fobs, electronic wallets, or any other device from which a PAN (primary account number) and associated information may be submitted to the POS device 102. Moreover, in accordance with the known concept of "tokenization" the payment card may store (for reading by the reader component 106) a numeric or character string known as a "payment token" that replaces the PAN for a portion of the operation of the payment system 100. The term "indicator number" will be used hereinafter to refer to either a PAN or a payment token.

The POS device 102 and the reader component 106 are typically conventional off-the-shelf items. The POS device 102 is in many cases located at a retail store location (not separately indicated) and operated by or on behalf of a merchant.

The POS device 102 and/or the reader component 106 include one or more display screens (not separately shown) for communicating information to the user and/or the sales associate who operates the POS device. (In some cases the POS device 102 is of the self-service type, such that it is operated entirely by the customer, and no sales associate is present.) One or more display screens in some cases comprise a touch screen and so may be an information input component as well as an information output component for the POS device 102.

In some retail stores, the POS device 102 is implemented as a suitably programmed smart phone or tablet computer having a small mag stripe reading accessory attached thereto.

A computer 108 operated by an acquirer (acquiring financial institution) is also shown as part of the system 100 in FIG. 1. The acquirer computer 108 operates to receive an authorization request for the transaction from the POS device 102. The acquirer computer 108 routes the authorization request via a payment network 110 to the server computer 112 operated by the issuer of the payment card account that is available for access by the payment card 104. The authorization response generated by the payment card issuer server computer 112 is routed back to the POS device 102 via the payment network 110 and the acquirer computer 108. Assuming that the authorization response indicates all is in order, the purchase transaction is completed at the point of sale. A subsequent settlement process results in a charge to the customer's payment card account and a credit to the bank account for the merchant maintained at the acquirer bank.

One example of a major payment network is the well-known Banknet system operated by MasterCard International Incorporated, which is the assignee hereof.

In some cases the functions performed by the acquirer computer 108 are performed by transaction processing entities rather than by the acquiring financial institution (merchant's bank) itself. Any computer or other device, including the acquirer computer 108 or a computer operated by a transaction processor, which serves as a point of entry for the POS device into the payment system 100, may hereinafter sometimes be referred to as a "transaction acquirer" or a "payment transaction acquirer". It should also be understood that in some cases a computer system (not shown) is operated at the merchant side as an interface between the POS device and the transaction acquirer.

The components of the system 100 as depicted in FIG. 1 are only those that are needed for processing a single transaction. It is common in existing payment systems that many payment card account transactions are processed simultaneously. Commercially operating payment systems typically include a considerable number of payment card issuers and their computers, a considerable number of acquirers and their computers, and numerous merchants and their POS devices and associated reader components. The systems also include a very large number of payment card account holders, who carry payment cards and/or other payment-enabled devices.

Figure 2:
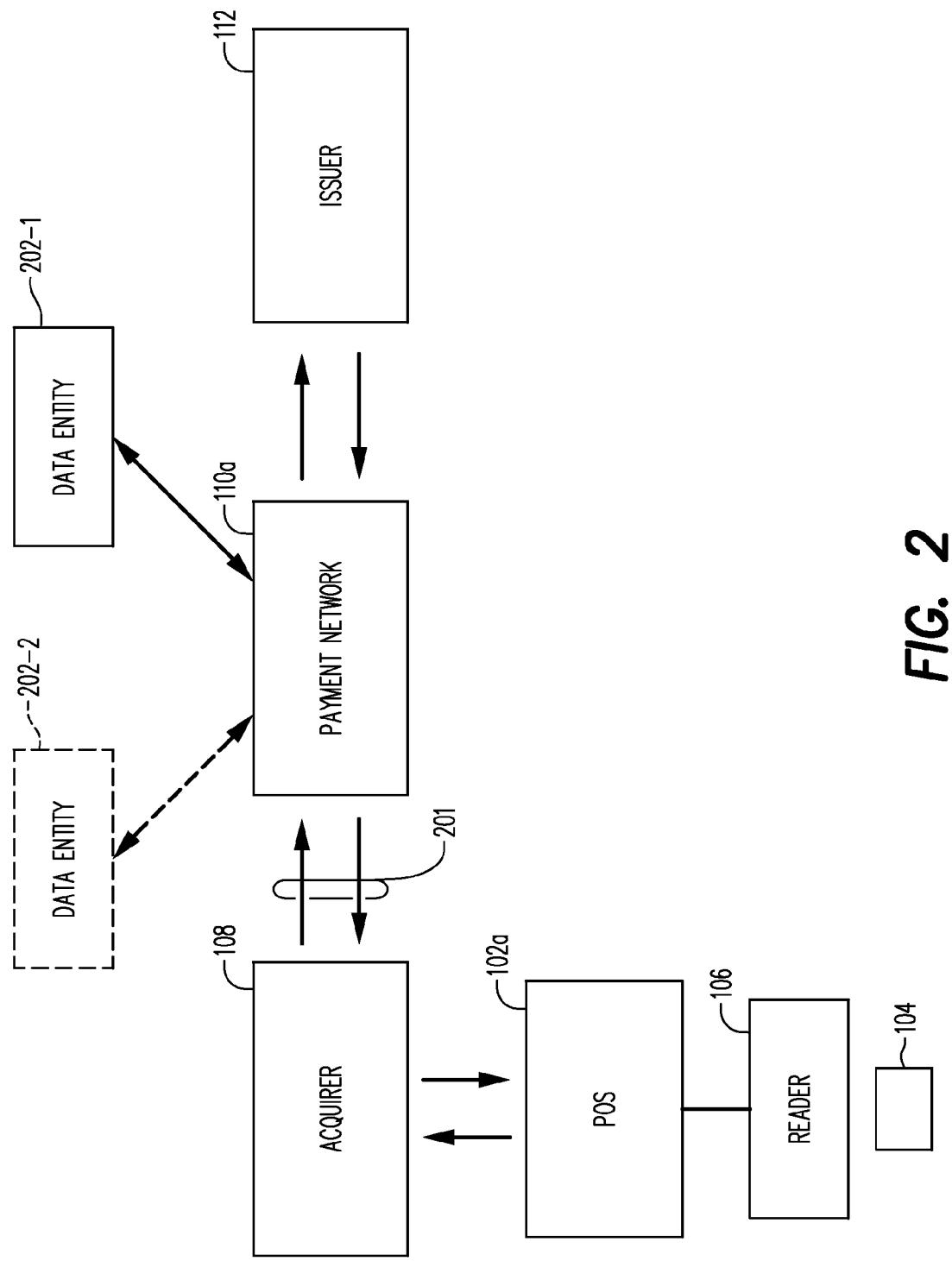
FIG. 2 is a block diagram that illustrates a system provided in accordance with aspects of the present disclosure.

FIG. 2 is a block diagram of a payment system 100a provided in accordance with aspects of the present disclosure. In many ways it is similar to the conventional payment system 100, in that it and its constituent components may perform all of the functions of a conventional payment system. Further, and in accordance with aspects of the present disclosure, some constituent components of the payment system 100a may perform additional functions, particularly with respect to communication of information that may be generated at or transmitted to the POS device, which is indicated by reference numeral 102a in FIG. 2. The POS device 102a may perform novel functions in connection with the payment system 100a. (The subsequent discussion herein with respect to FIG. 7 and other subsequent portions hereof will describe novel functions of the POS device 102a.)

Moreover, the payment network is indicated by reference numeral 110a in the drawing to reflect novel functionality provided by the payment network 110a in the payment system 100a. (Among other portions of the ensuing discussion, the reader may note the description below regarding FIG. 6 with respect to novel functions of the payment network 110a.)

Other components of the payment system 100a may be substantially or entirely conventional in their operations, including the payment card 104, the reader component 106, the transaction acquirer 108 and the issuer server computer 112. As to the transaction acquirer 108, it may continue to be entirely conventional in some embodiments, serving as a conduit for communications between the payment network 110a and the POS device 102a, although some of the content of those communications may be novel. In other embodiments, the messaging format utilized among the POS device 102a, the transaction acquirer 108 and the payment network 110a may be enhanced to accommodate enhanced communication capabilities of the payment system 100a, in which cases the transaction acquirer 108 may incorporate software programming to support the enhanced messaging format, although its essential manner of functioning may not differ from conventional transaction processing. A conventional communication channel (reference numeral 201) may be in place between the payment network 110a and the transaction acquirer 108.

Figure 3:
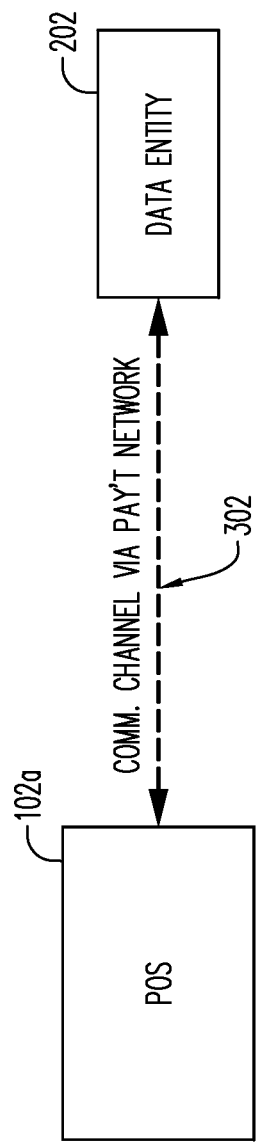
FIG. 3 schematically illustrates a virtual communication channel provided in the system of FIG. 2 via a payment network that is part of the system.

In comparing FIG. 2 to FIG. 1, it will be noted that the payment system 100a includes additional components as compared to the payment system 100 of FIG. 1. These additional components are one or more "data entities" 202 shown in communication with the payment network 100a. Each data entity 202 is (a) a recipient of transaction information or other information generated or collected at the POS device 102a and relayed to the data entity 202 via the payment network 110a, and/or each data entity 202 is (b) a source of information to be relayed via the payment network 100a for delivery to and display at the POS device 102a. Thus, as schematically illustrated in FIG. 3, the payment system 100a helps to implement a communication channel 302 between the data entity 202 and the POS device 102a, with at least a portion of the communication channel 302 being constituted by the payment network 110a and the transaction acquirer 108.

As will be understood from more detailed examples provided below, each data entity 202 may be a third party (not an issuer, not a transaction acquirer) that has an interest in receiving data from and/or transmitting data to the POS device 102a. It should be understood that the blocks 202 shown in FIGS. 2 and 3 may represent computers operated on behalf of the respective data entities 202 as well as the data entities themselves. The computers constituting/operated by the data entity(ies) 202 may be conventional in their hardware aspects. The exchange or transfer of information between the data entity(ies) 202 and the POS device 102a may support opportunities to provide enhanced services to a customer (not shown) who is present at the POS device 102a. Examples of such enhanced services will be described below.

Referring again to FIG. 2, it should be understood that, as was the case with FIG. 1, the drawing shows essentially system components required for one particular transaction. In a practical embodiment of the payment system 100a, the system may include numerous issuers and transaction acquirers, a very large number of POS devices and associated card readers, and millions of payment cards carried and used by millions of cardholders. In some embodiments, a considerable number of data entities 202 may also participate in the payment system 100a as recipients and/or sources of data.

Figure 4:
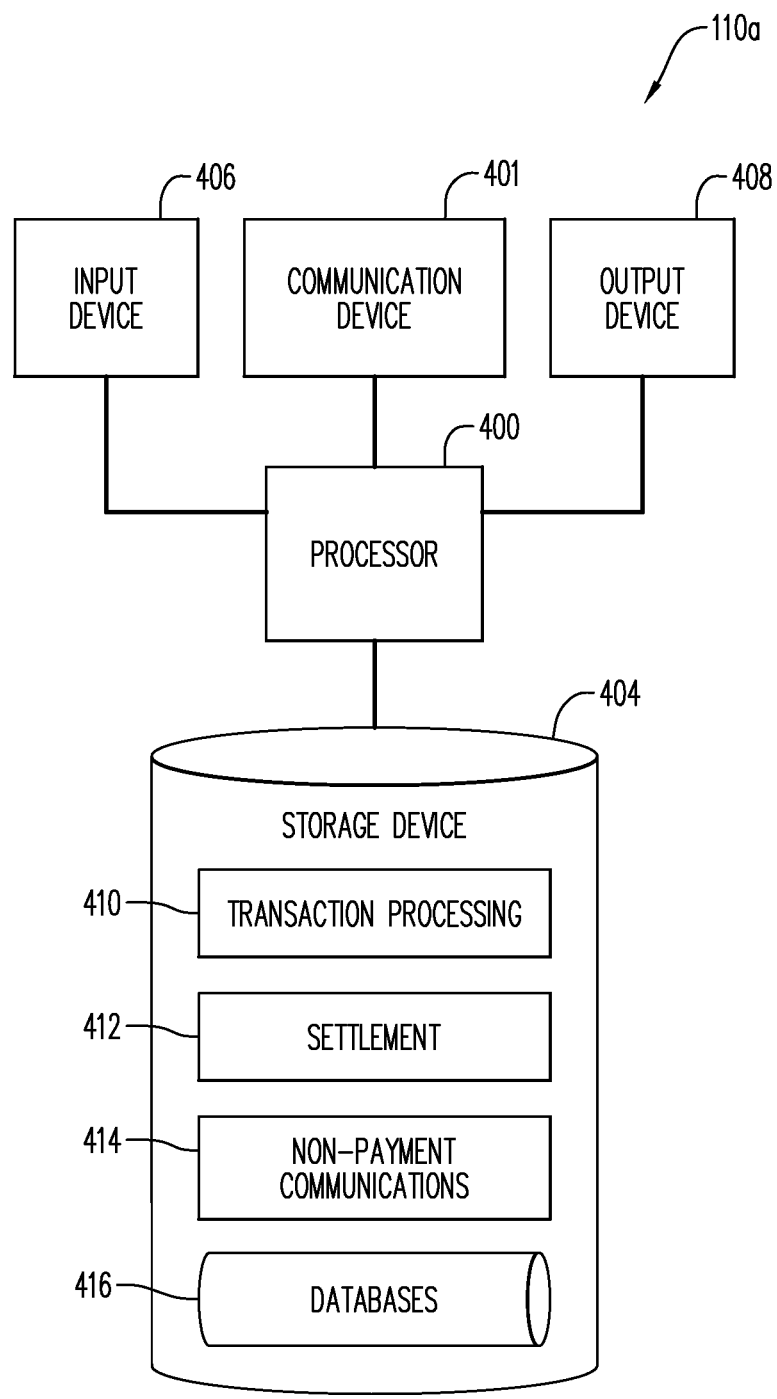
FIG. 4 is a block diagram representation of a server computer that implements at least some of the functionality of the payment network that is part of the system of FIG. 2.

FIG. 4 is a block diagram that illustrates an embodiment of a computer that may implement at least some of the functionality of the payment network 110a (FIG. 2). Thus for purposes of FIG. 4 and other portions of the ensuing discussion, the computer as illustrated in FIG. 4 will be referred to as the "payment network computer 110a".

The payment network computer 110a may be conventional in its hardware aspects but may be controlled by software to cause it to function as described herein.

For example, the payment network computer 110a may be constituted by conventional mainframe computer and/or server computer hardware.

The payment network computer 110a may include a computer processor 400 operatively coupled to a communication device 401, a storage device 404, an input device 406 and an output device 408.

The computer processor 400 may be constituted by one or more conventional processors. Processor 400 operates to execute processor-executable steps, contained in program instructions described below, so as to control the payment network computer 110a to provide desired functionality.

Communication device 401 may be used to facilitate communication with, for example, other devices (such as the issuer server computer 112, the transaction acquirer 108 and one or more data entities 202—all shown in FIG. 2). For example (and continuing to refer to FIG. 4), communication device 401 may comprise numerous communication ports (not separately shown), to allow the payment network computer 110a to communicate simultaneously with numerous acquirers and issuers in connection with a high volume of payment card account transactions, while also handling some volume of additional communications required to serve the needs of the data entities 202.

Input device 406 may comprise one or more of any type of peripheral device typically used to input data into a computer. For example, the input device 406 may include a keyboard and a mouse. Output device 408 may comprise, for example, a display and/or a printer.

Storage device 404 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 404 stores one or more programs for controlling processor 400. The programs comprise program instructions (which may be referred to as computer readable program code means) that contain processor-executable process steps of the payment network computer 110a, executed by the processor 400 to cause the payment network computer 110a to function as described herein.

The programs may include one or more conventional operating systems (not shown) that control the processor 400 so as to manage and coordinate activities and sharing of resources in the payment network computer 110a, and to serve as a host for application programs (described below) that run on the payment network computer 110a.

The programs stored in the storage device 404 may also include a transaction processing program 410 that is provided in accordance with known principles to control the processor 400 to enable the payment network computer 110a to handle the above-mentioned high volume of payment card account transactions, including receiving and routing authorization requests and authorization responses in a conventional manner.

In some embodiments the payment network computer 110a also handles settlements of payment card account transactions, and in such a case, the storage device 404 may also store a settlement software program 412 to control the computer processor 400 to provide this functionality. The settlement software program 412 may be constituted in accordance with conventional principles.

Another program that may be stored in the storage device 404 is an application program 414 that is provided in accordance with aspects of the present invention and that controls the processor 400 to enable the payment network computer 110a to aid in implementing the above-mentioned communication channel 302 (FIG. 3) between one or more data entities 202 and POS devices 102a. Thus a function of the application program 414 is to facilitate communication via the payment network 102a that is not directly required for processing of payment card account transactions. Details of various features and/or embodiments of the non-payment communication application program 414 will be described below, including the below discussion of FIG. 6.

The storage device 404 may also store, and the payment network computer 110a may also execute, other programs, which are not shown. For example, such programs may include a reporting application, which may respond to requests from system administrators for reports on the activities performed by the payment network computer 110a. The other programs may also include, e.g., device drivers, etc., as well as conventional data communication software that may underlie the non-payment communication application program 414.

The storage device 404 may also store one or more databases 416 required for operation of the payment network computer 110a.

The payment network computer 110a is depicted as a more or less unitary computer system in FIG. 4, but in practice it may be implemented as two or more computer systems that are in frequent/constant communication with each other and that cooperate to provide the functionality ascribed herein to the payment network computer 110a.

Figure 5:
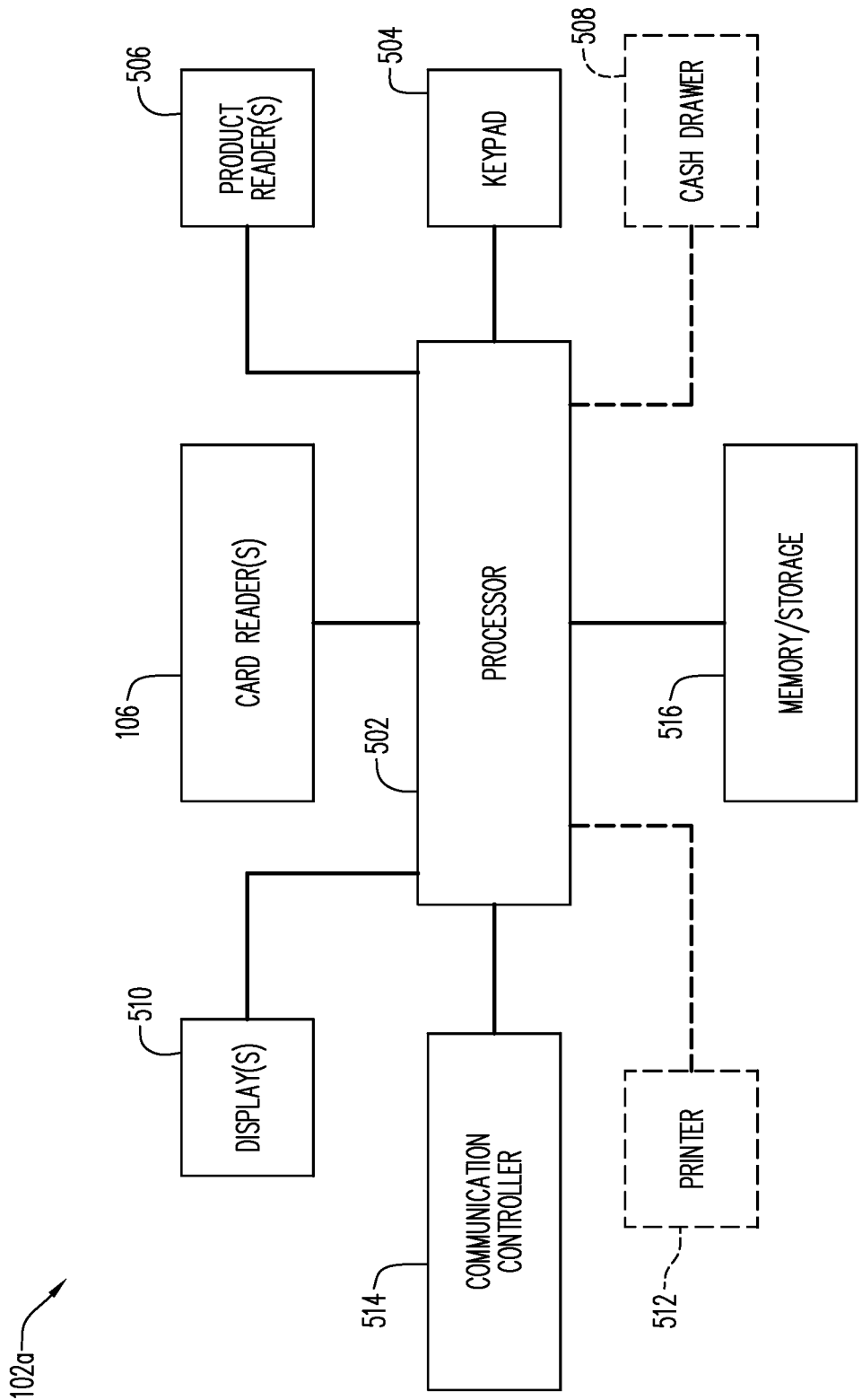
FIG. 5 is a block diagram representation of a typical POS device that may embody aspects of the present disclosure.

FIG. 5 is a block diagram of a typical embodiment of the POS device 102a depicted in FIG. 2 (and incorporating the reader component 106—also shown in FIG. 5). In some embodiments, the POS device 102a may be largely or entirely conventional in its hardware aspects. Nevertheless, the POS device 102a may be programmed in accordance with aspects of the present disclosure to provide functionality as described herein. It may also be the case that the POS device 102a has more expansive customer-facing display elements (reference numeral 510, mentioned below) than a typical point of sale device, including for example a large touchscreen, which is not separately shown in the drawing apart from display elements 510.

The POS device 102a may include a processing element (or elements) such as the processor 502 shown in FIG. 5. The processor 502 may, for example, be a conventional microprocessor, and may operate to control the overall functioning of the POS device 102a. In other embodiments, such as when the POS device 102a is constituted primarily by a smartphone, the processor 502 may be one or more processing elements of conventional smart phone integrated circuit components.

The POS device 102a may also include conventional peripheral components, in communication with and/or controlled by the processor 502, such as: (a) a keypad 504 for receiving input from the human operator of the POS terminal; (b) a product reader 506 for reading any form of unique product identifier, such as a barcode or RFID, that appears on, or is attached to, products brought to the terminal for purchase; (c) a cash drawer 508 for storing cash received from customers; (d) the card reader(s) 106, which, as noted above may include a mag stripe reader, and/or a contactless IC chip reader, or additionally or alternatively, a contact IC chip reader, a proximity reader for reading payment card information from a payment-enabled smart phone, a fob reader, and/or other device for reading payment card information; (e) one or more displays 510 (as mentioned above) for providing output (e.g., identifying products presented for purchase and their prices, indicating sales tax due, indicating transaction subtotals and totals, etc., providing prompts to the customer and/or to the sales associate; and/or displaying information downloaded via messaging from a data entity 202 to the POS device 102*a*); (f) a printer 512 for printing out sales receipts; and (g) a communication controller 514 for allowing the processor 502, and hence, the POS device 102*a* to engage in communication over data networks with other devices (e.g., a merchant processing system (not shown), and a transaction acquirer (FIG. 2)). (In some embodiments, at least one of the displays 510 may be a touch screen, so as to provide an input function as well as an output function. This will particularly likely be the case if the POS device 102*a* is primarily constituted by a smart phone. In the latter case, the product reader 506 may be constituted by a camera feature of the smart phone.)

In addition, the POS device 102*a* may include one or more memory and/or data storage devices (indicated collectively at 516), which may comprise any combination of one or more of a hard disk drive, RAM (random access memory), ROM (read only memory), flash memory, etc. The memory/data storage device(s) 516 may store software and/or firmware that programs the processor 502 and the POS device 102*a* to perform functionality as described herein. Further, the POS device 102*a* may include one or more housings (not shown) which contain and/or support one or more of the other components shown in FIG. 5.

Figure 6:
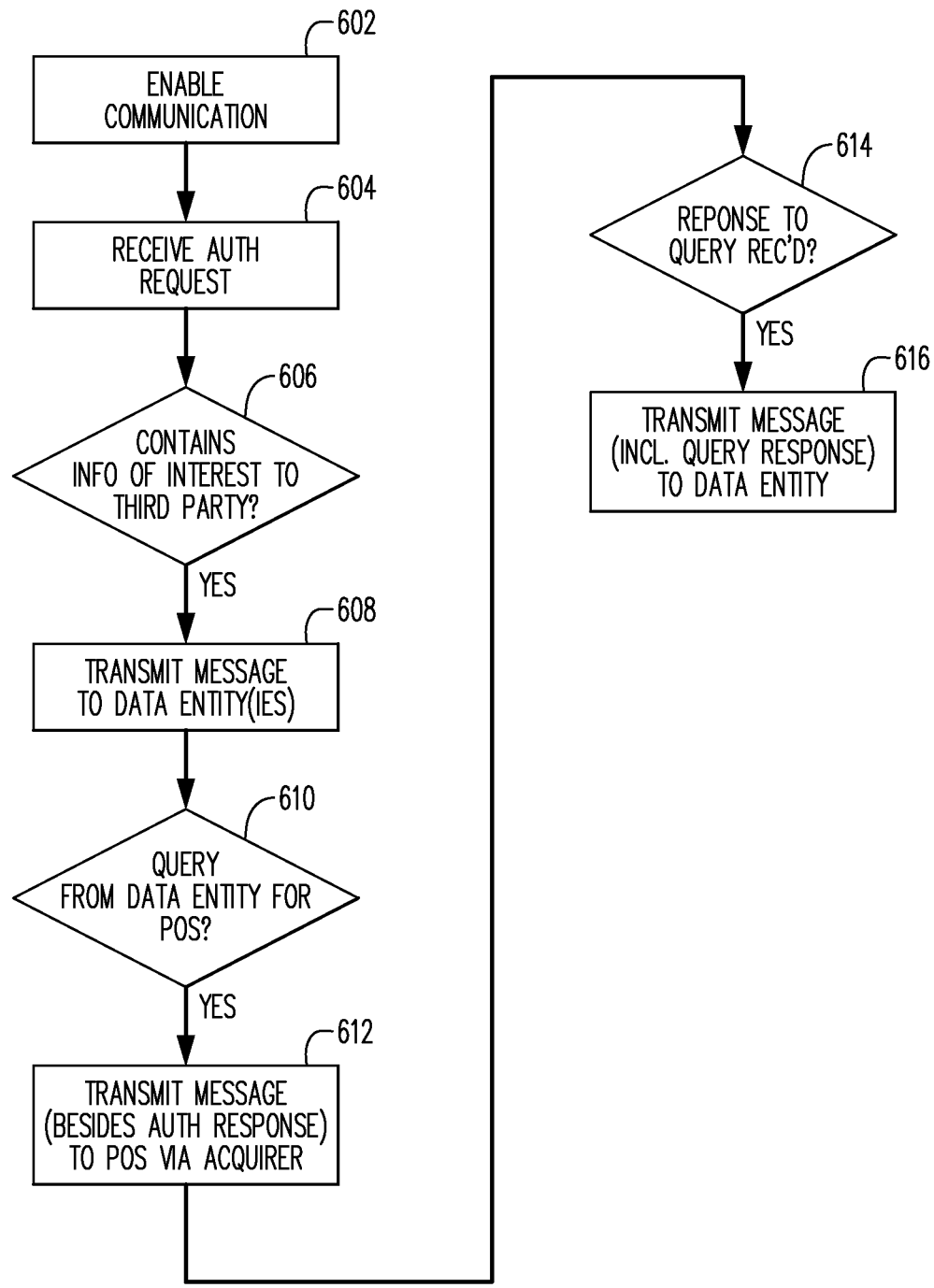
FIG. 6 is a flow chart that illustrates aspects of the present disclosure, including a portion of the operations of the server computer of FIG. 4.

FIG. 6 is a flow chart that illustrates aspects of the present disclosure, including a portion of the operations of the payment network computer 110*a* (FIGS. 2 and 4).

At 602 in FIG. 6, it is assumed that communication channels are in place between the payment network computer 110*a* and the transaction acquirer 108 (and numerous other acquirers as well), and also between the payment network computer 110*a* and one or more data entities 202. The communication channels may be generally conventional and may allow the payment network computer 110*a* to receive payment card account transaction authorization requests from the transaction acquirer 108 and other acquirers, and to transmit authorization responses to the transaction acquirer 108 and other acquirers.

At 604 in FIG. 6, the payment network computer 110*a* receives a payment card account transaction authorization request from the transaction acquirer 108. It may be assumed that the authorization request originated from the POS device 102*a* in connection with a purchase transaction that is taking place with a customer at the POS device 102*a*. The authorization request may include a conventional payload of transaction information, such as an indicator number (a PAN or payment token, e.g.) that identifies or points to the customer's payment card account, a transaction amount, information that identifies the merchant and merchant location, etc. The authorization request may include additional information as well, such as is described in examples set forth below.

In FIG. 6, a decision block 606 may follow block 604. At decision block 606, the payment network computer 110*a* may determine whether the authorization request includes information that may be of interest to one or more data entity(ies) 202. Examples of such information may include, for example, product information such as a product identifier (SKU (stock keeping unit) number, e.g.) and also possibly a specific serial/identification number for the particular unit of merchandise that is being purchased in the current transaction. As another example, the additional information may identify a particular repair or maintenance procedure that is the subject of the purchase transaction; e.g., the additional information may identify a particular automotive repair or maintenance service and may also contain the unique vehicle identification number for a motor vehicle on which the service was performed. In some embodiments, the additional information may be contained in an authorization request message format within currently prescribed data elements available for including information not required by payment card account issuers. In other embodiments, the format for the authorization request may be modified from currently existing standards to incorporate additional transaction information data fields beyond what is now customarily communicated to the issuer via the payment network, and the additional information may be at least partly contained within such data fields.

If the payment network computer 110*a* makes a positive determination at decision block 606 (i.e., if the payment network computer 110*a* determines that the authorization request received at 604 included information to be communicated to a data entity 202), then block 608 may follow block 606. At block 608, the payment network computer 110*a* transmits a message to at least one of the data entities 202 containing at least some of the additional information (e.g., product information).

In some embodiments, the payment network computer 110*a* makes the determination at decision block 606 by reading the content of the additional information. In addition or alternatively, the authorization request may contain a flag that specifically identifies the authorization request as containing information intended or expected to be relayed by the payment network computer 110*a* to a data entity. In some embodiments, the flag and/or the additional information may in effect contain addressing information that identifies a particular one (or more than one) data entity 202 to which the payment network computer 110*a* should forward some or all of the additional information. Thus the payment network computer 110*a* may make the determination at decision block 606 based at least in part on reading a flag and/or data entity addressing information in the authorization request received at 604.

Decision block 610 follows block 608 in the process of FIG. 6. At decision block 610, the payment network computer 110*a* determines whether it has received a query message back from the data entity 200 to which the payment network computer 110*a* transmitted the message in block 608. The query message, if received, may contain a query to be presented to the customer at the POS device 102*a* that originated the authorization request received at block 604. For example, the query may ask the customer to indicate whether the customer wishes to purchase an extended warranty on the product that the customer is purchasing in the current transaction. Another example of a query that the data entity 202 may send for display to the customer by the POS device 102a is asking whether the customer wishes to engage in a warranty registration process for the product that he/she is purchasing.

If the payment network computer 110a makes a positive determination at decision block 610 (i.e., if the payment network computer 110a determines that it has received a query message from the data entity 202), then block 612 may follow decision block 610. At block 612, the payment network computer 110a may transmit a message including the query to the transaction acquirer 108, with the expectation that the query will be forwarded to the POS device 102a from the transaction acquirer 108. In some embodiments, the query may be incorporated in the authorization response that the payment network computer 110a provides in response to the authorization request that the payment network computer 110a received at block 604. That is, the payment network computer 110a may have received a conventional authorization response (not illustrated in FIG. 6) from the issuer 112 of the customer's payment card account, and may insert the query into the authorization response before routing the authorization response onward to the transaction acquirer 108. Alternatively, in other embodiments, the payment network computer 110a may send the query to the POS terminal 102a via the transaction acquirer 108 in a message that is separate from the authorization response.

In some embodiments, the payment network computer 110a may manage the timing of the query that originated from the data entity 202 vis-à-vis the timing of the authorization response from the issuer 112. In some embodiments, for example, the payment network computer 110a may hold the authorization response, at least for a predetermined period of time, until it receives the query from the data entity 202. The payment network computer 110a may then insert the query into the authorization response for routing to the transaction acquirer 108 and on to the point of sale.

Continuing to refer to FIG. 6, decision block 614 may follow block 612. At decision block 614, the payment network computer 110a may determine whether it has received a message containing the customer's response to the query that was sent via the transaction acquirer 108 at 612. If the payment network computer 110a makes a positive determination at decision block 614 (i.e., if the payment network computer 110a determines that it has received a message containing a response to the query), then block 616 may follow decision block 614. At block 616, the payment network computer 110a may send a message to at least one of the data entities 202. The message sent at block 616 by the payment network computer 110a may include the customer's response to the query as received by the payment network computer 110a.

In the process as depicted in FIG. 6, there is at least a possibility for a round of communications between a data entity 202 and a customer at the point of sale, including a query for the customer from the data entity and a response from the customer that is routed back to the data entity 202 via the payment network 110a. In some embodiments, there may be several rounds of such communication between the data entity 202 and the customer, with the data entity potentially posing additional queries to the customer depending on the content of one or more previous responses from the customer.

In a more detailed description of an example embodiment of the payment system 100a, let it be assumed that the purchase transaction is taking place at an electronics store and involves an electronic device (e.g., a large screen television) that is covered by a manufacturer's or distributor's warranty. Let it also be assumed that the particular device being purchased comes with a warranty card—i.e., a magnetic stripe card or IC card—that stores data that indicates the make, model number and individual device serial number for the purchased item. The POS device 102a may read the warranty card in addition to or instead of reading the conventional product identification barcode in order to look up the price for the purchased item. The POS device 102a may calculate an applicable sales tax amount and a transaction total and may include the transaction total in an authorization request that it generates. The POS device 102a may also include in the authorization request at least some of the information that it read from the warranty card, such as make, model number and serial number of the purchased item. In some embodiments, the POS device 102a may also set or insert a flag in the authorization request to indicate that product-warranty-relevant information is included in the authorization request.

When the authorization request arrives at the payment network 110a (via the transaction acquirer 108), the payment network 110a may detect that product-warranty-relevant information is included in the authorization request. In some embodiments, the customer may have pre-registered a product warranty database entry (as in, for example, co-pending and commonly assigned U.S. patent application Ser. No. 14/172,311). The payment network 110a may access that customer's database entry, using the indicator number in the authorization request to identify the customer, and thereby may obtain the customer's name and contact information. The payment network 110a may identify the product manufacturer/distributor or the warranty services provider for the manufacturer/distributor from the make and/or the model number for the purchased item. The product manufacturer/distributor/warranty services provider may thus be the data entity 202 in this particular example. The payment network 110a may send information about the purchase transaction to the data entity 202, including product make, model, serial number; customer name and contact information; and merchant name and location to the data entity 202 to effect warranty registration for the purchased item.

According to possible variations in this example, the POS device 102a may in some embodiments read the purchased item serial number from a barcode on the purchased item, with no warranty card having been provided with the purchased item. As another alternative, the sales associate at the point of sale may manually enter the purchased item serial number into the POS device 102a.

According to another variation, the payment network 110a may include the indicator number from the authorization request in the message that the payment network 102a sends to the data entity 202. The data entity 202 may then seek and obtain the contact information for the customer from the issuer 112 of the customer's payment card account. In some embodiments, the actions referred to in this paragraph may only occur if the customer had previously opted in/consented via the issuer 112 that such actions could take place.

In another variation of this example, let it be assumed that the data entity 202 is not concerned with product warranties or registration of the same, but rather is a marketing organization that has been retained to promote subscriptions to a satellite television programming service. In this example, the product information received by the payment network 110a in the authorization request need not include the product serial number; it may suffice that the make and model number of the purchased item correspond to a very large screen television set. When the payment network 110a recognizes this fact, it may send a message to the data entity 202, which may respond by sending to the payment network 102a a query to be presented to the customer at the POS device 102a, namely whether the customer is interested in subscribing to the service, and if so to enter the customer's mobile phone number at the POS device 102a. The customer may do so, and the resulting affirmative response and the customer's phone number may be transmitted from the POS device 102a to the payment network 110a via the transaction acquirer 108. The payment network 110a then may relay the information by a message to the data entity 202. It should be understood that with this information in hand, the data entity can now directly contact the customer by, e.g., sending a text message to the customer's mobile phone—the text message could contain a link that points to a promotional offer page, a subscriber enrollment webpage for the satellite television service, etc.

It should be understood that many variations are possible with respect to possible communication of promotion/marketing related information between a data entity and a customer at the point of sale via the payment network 110a.

In another example embodiment, the additional information may relate to automotive repair and maintenance services. For this example, let it be assumed that there are two data entities 202-1 and 202-2, with the former being a warranty services information provider for a motor vehicle manufacturer and the latter being a product recall services provider for the same manufacturer. In this example, the manufacturer may offer a standard three-year product warranty for new vehicles, with an additional, no-charge one-year extension of the warranty available if the customer signs up for and complies with a routine maintenance program through the service departments of the manufacturer's authorized dealerships.

In this case the desired communication may be between an employee of the merchant (i.e., the vehicle service facility) and one or both of the data entities 202-1 and 202-2. The employee of the merchant may input data into the POS device 102a such as the vehicle identification number (VIN) for the vehicle that is being serviced and the type of service being performed on the vehicle, as well as the make, model and model year of the vehicle. In some embodiments, the merchant employee may wish to learn details of the warranty coverage for the vehicle, and the authorization request submitted via the POS device 102a may include a query to this effect, along with the vehicle information, etc., that was input by the merchant employee. The payment network 110a may route a message to the appropriate data entity(ies) based on the model of the vehicle. The message may include the query from the merchant employee and the information identifying the vehicle and advising the data entity(ies) of the service that is being performed on the vehicle. The merchant (e.g., dealer service department or independent repair facility/gas station) may also be identified in the message to the data entity(ies). The warranty services provider data entity may respond with information that identifies the existing warranty coverage for the vehicle. The message containing this information may be received by the payment network 110a, which may then forward it in another message sent via the transaction acquirer 108 to the POS device 102a. In this way the merchant employee at the POS device 102a may receive the information he/she was seeking.

As another aspect of this example, the vehicle and service transaction information transmitted from the POS device 102a and relayed to the data entity(ies) by the payment network 110a may permit the data entities to keep track of service that has been performed on the vehicle, and may allow the warranty services provider data entity to verify that the vehicle owner has complied with obligations to obtain routine maintenance services for the vehicle.

The information sent to the data entity(ies) from the POS device 102a may also include the name and contact information for the customer, who may have changed his/her mailing address since purchasing the vehicle, or who may not be the original owner of the vehicle. Thus the information channel from the merchant to the recall services provider data entity may provide information that allows the latter data entity to have an up-to-date data record for the vehicle if it should become necessary to disseminate safety information to the current owner and/or to initiate a safety recall for the vehicle.

Figure 7:
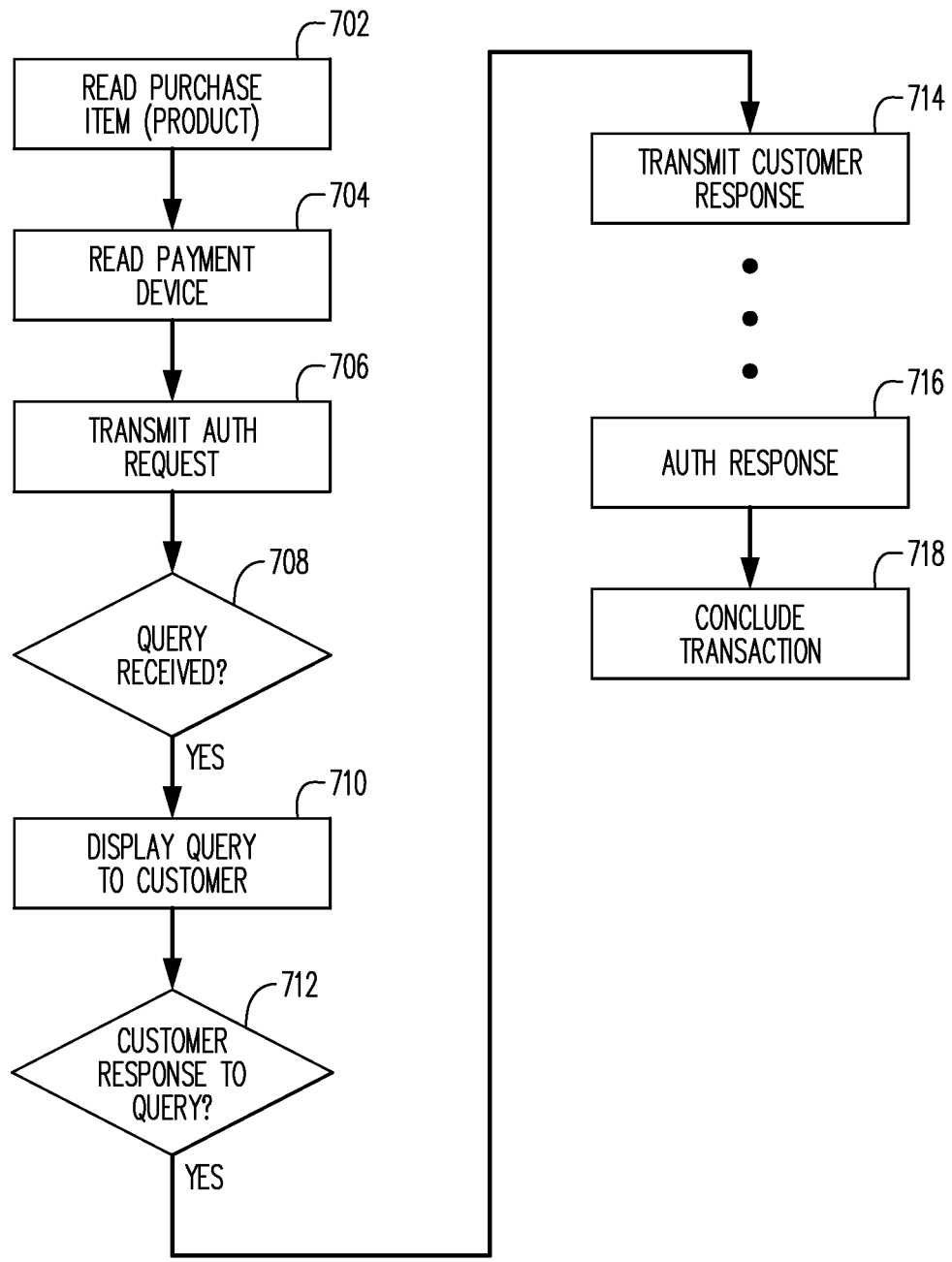
FIG. 7 is a flow chart that illustrates aspects of the present disclosure, including a portion of the operations of the POS device of FIG. 5.

FIG. 7 is a flow chart that illustrates aspects of the present disclosure, including a portion of the operations of the POS device 102a (FIGS. 2, 3 and 5). The process illustrated in FIG. 7 may be understood as a confirmation of, and elaboration on, operations of the POS device 102a as will already have been grasped from example embodiments previously described herein.

At block 702 in FIG. 7, the POS device 102a may read the purchased item for purposes such as looking up the price of the item, obtaining product information such as that described in previous examples, etc.

At block 704, the POS device 102a may read the payment card 104 (FIG. 2) to obtain the indicator number and other information commonly needed for payment card account transactions.

At block 706, the POS device 102a may generate and transmit (to the transaction acquirer 108) an authorization request. The authorization request may contain all the information that is conventionally present in such a message. Further, and as described in example embodiments hereinabove, the POS device 102a may include additional information in the authorization request, such as information about the purchased item (if the current transaction is a sale of goods), or information about services provided by the merchant to the customer. It should be understood that the nature of possible additional information of interest to a data entity 202 is not limited to information about the product or service that is the subject of the payment card account transaction. For example, in some embodiments, the merchant may collect demographic information about the customer and may include such demographic information or a portion thereof as additional information in the authorization request.

In the process of FIG. 7, a decision block 708 may follow block 706. At decision block 708, the POS device 102a may determine whether it has received a query, of the type referred to in connection with block 612 in FIG. 6, originating from a data entity 202 and forwarded via the payment network computer 110a. If the POS device 102a makes a positive determination at decision block 708 (i.e., if the POS device 102a determines that it has received such a query), then block 710 may follow decision block 708. At block 710, the POS device 102a may display the query to the customer. For example, the POS device 102a may display the query on a customer-facing touch screen. At the same time, the touch screen may display one or more virtual buttons that may be actuatable by the customer by touch to indicate the customer's response to the query.

A decision block 712 may follow block 710. At decision block 712, the POS device 102a may determine whether the customer has provided a response to the query that was displayed at 710. If so, then block 714 may follow decision block 712. At block 714, the POS device 102a may transmit to the transaction acquirer 108 (for relaying on to the payment network computer 110a then onward to the data entity 202) a message that contains the customer's response to the query.

The process of FIG. 7 also includes a block 716, at which the POS device 102a receives an authorization response that originated from the issuer 112 (FIG. 2) and that was routed to the POS device 102a via the payment network computer 110a and the transaction acquirer 108. In some embodiments, the authorization response may be entirely conventional. In other embodiments, for example, the authorization response may have had the data entity's query inserted therein, and so may coincide in part with the query detected by the POS device 102a at decision block 708.

The process of FIG. 7 also includes a block 718, at which the payment card account transaction may be completed in a conventional manner in accordance with the authorization response received by the POS device 102a at 716.

In some embodiments, depending on the nature of the query received by the POS device 102a and displayed at 710, and also depending on the customer's response, the customer's response may lead to an additional purchase transaction via the POS device 102a. For example, the query may contain a promotional offer that the customer may accept, leading to a further purchase.

In addition to functions explicitly represented in FIG. 7, in some embodiments the POS device 102a may be operated such that an operator of the device may manually via a physical or virtual keyboard or by other means enter information into the device for forwarding to a data entity 202 via the payment network 110a.

Above-described example embodiments have involved a POS device 102a situated at a retail store or the like. In addition, however, the teachings of this disclosure are also applicable to e-commerce transactions, and the POS device 102a accordingly may in some embodiments be a merchant's e-commerce server computer, which may transmit and/or receive information to or from a data entity via the payment network computer 110a.

As used herein, "purchased item" includes an item presented for purchase at a point-of-sale terminal or device.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling purchase transactions and related transactions. An example of such a system is the one operated by MasterCard International Incorporated, the assignee of the present disclosure. In some embodiments, the term "payment card system" or "payment system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
providing a communication channel between a transaction acquirer and a payment network, the communication channel for transmitting payment card account transaction authorization requests from the transaction acquirer to the payment network;
receiving a first message at the payment network via the communication channel, the first message originating from a point of sale (POS) terminal and being relayed to the payment network via the transaction acquirer, the first message including an indicator number that identifies a customer of a transaction at the POS terminal and further including product information of an item included in the transaction;
identifying, by the payment network, a device associated with a warranty provider of the item based on data within the first message and transmitting a second message from the payment network to the identified device associated with the warranty provider, the second message including the product information of the item obtained during the transaction at the POS terminal;
receiving a third message at the payment network from the device associated with the warranty provider, the third message comprising a query for the customer; and
transmitting a fourth message from the payment network to the transaction acquirer via the communication channel, the fourth message containing the query for the customer of the transaction to be displayed at the POS terminal.

2. The method of claim 1, further comprising:
receiving a fifth message at the payment network via the communication channel, the fifth message originating at the POS terminal and containing a response to the query; and
transmitting a sixth message from the payment network to the device associated with the warranty provider, the sixth message containing the response to the query.

3. The method of claim 1, wherein the fourth message does not contain an authorization response.

4. The method of claim 1, wherein the product information comprises one or more terms of a product warranty for the item.

5. The method of claim 4, wherein the product information comprises repair information about the item under the product warranty.

6. The method of claim 5, wherein the item is a motor vehicle.

7. The method of claim 5, wherein the warranty provider comprises a manufacturer or distributor of the item.

8. The method of claim 1, wherein the second message does not include a payment transaction authorization request.

9. A method comprising:
receiving a first message in a payment network, said first message being a first authorization request message, the first authorization request message initiated as part of a purchase transaction for a product, the first authorization request message including (a) an indicator number that represents a payment card account to be used for the purchase transaction; and (b) product information that identifies the product subject to the purchase transaction;
transmitting a second message from the payment network to an issuer of the payment card account, said second message being a second authorization request message; and
identifying, by the payment network, a device associated with a warranty provider of the product included in the purchase transaction based on data within the first message and transmitting a third message from the payment network to the identified device associated with the warranty provider, the third message including the product information of the product obtained during the purchase transaction.

10. The method of claim 9, wherein the product information includes make, model and serial number information for an item purchased in the purchase transaction.

11. The method of claim 9, wherein:
the purchase transaction is a purchase of maintenance or repair services for a motor vehicle; and
the product information includes make, model and serial number information for the motor vehicle.

12. The method of claim 11, wherein the identified warranty provider comprises a manufacturer or distributor of the motor vehicle.

13. The method of claim 11, wherein the identified warranty provider comprises a product warranty service organization.

14. The method of claim 11, wherein the identified warranty provider comprises a product safety recall services organization.

15. The method of claim 9, wherein the indicator number is a primary account number (PAN).

16. A method comprising:
providing a communication channel between a transaction acquirer and a payment network, the communication channel for transmitting payment card account transaction authorization requests from the transaction acquirer to the payment network;
receiving a first message at the payment network via the communication channel, the first message originating from a point of sale (POS) terminal and being relayed to the payment network via the transaction acquirer, the first message including an indicator number that identifies a customer of a transaction at the POS terminal and further including product information of an item included in the transaction;
identifying a first device and a second device associated with at least one warranty provider of the item based on data within the first message;
transmitting a second message from the payment network to the first identified device associated with the at least one warranty provider, the second message including the product information of the item obtained during the transaction at the POS terminal; and
transmitting a third message from the payment network to the second identified device associated with the at least one warranty provider, the third message including the product information of the item obtained during the transaction at the POS terminal.

17. The method of claim 16, wherein:
the first device is associated with a product manufacturer or distributor; and
the second device is associated with a product warranty service organization.

18. The method of claim 16, wherein:
the first device is associated with a product safety recall services organization; and
the second device is associated with a product warranty service organization.

* * * * *